(No Model.)
7 Sheets—Sheet 2.
E. A. MARSH.
SCREW MACHINE.
No. 329,182.
Patented Oct. 27, 1885.
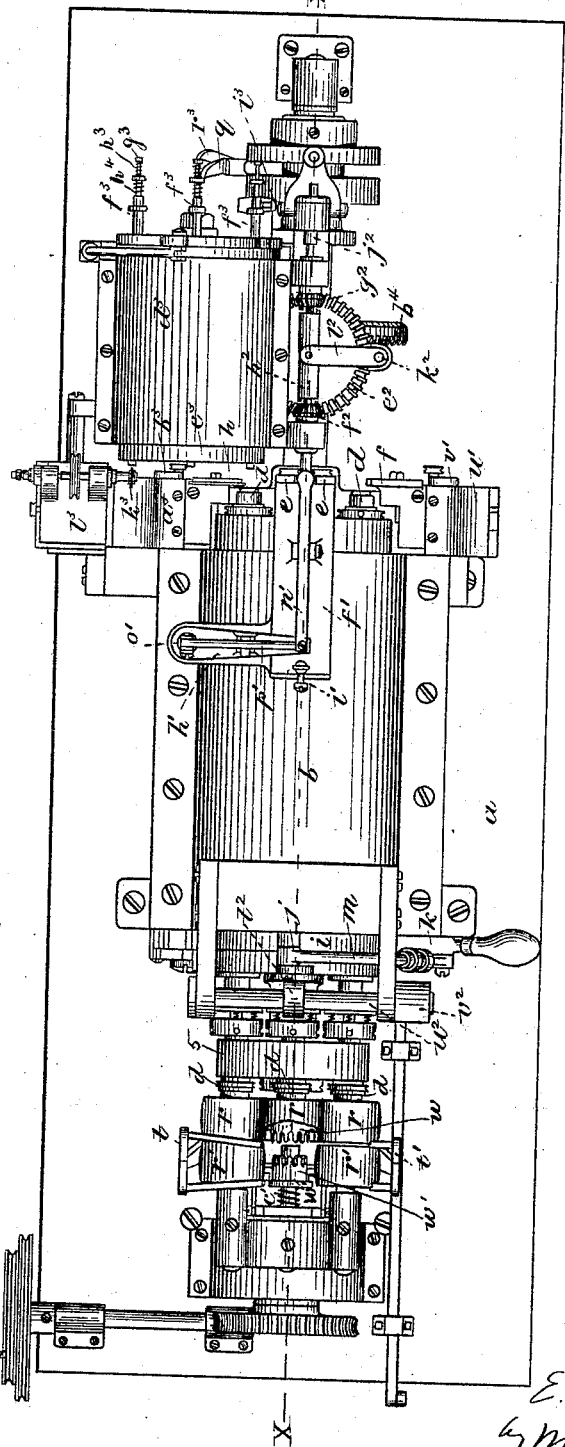
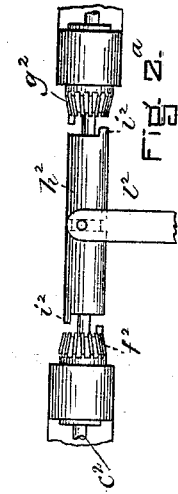
Fig. 2.
WITNESSES.
INVENTOR.

(No Model.)

E. A. MARSH.
SCREW MACHINE.

No. 329,182.     Patented Oct. 27, 1885.

7 Sheets—Sheet 3.

WITNESSES.
Thos. E. O'Connor
Horace Brown

INVENTOR.
E. A. Marsh
by Wright & Brown
Attys.

(No Model.) 7 Sheets—Sheet 4.

E. A. MARSH.
SCREW MACHINE.

No. 329,182. Patented Oct. 27, 1885.

WITNESSES.
Thos. E. O'Connor
H Brown.

INVENTOR.
E. A. Marsh
by Wright & Brown
Attys.

(No Model.) 7 Sheets—Sheet 5.
E. A. MARSH.
SCREW MACHINE.
No. 329,182. Patented Oct. 27, 1885.
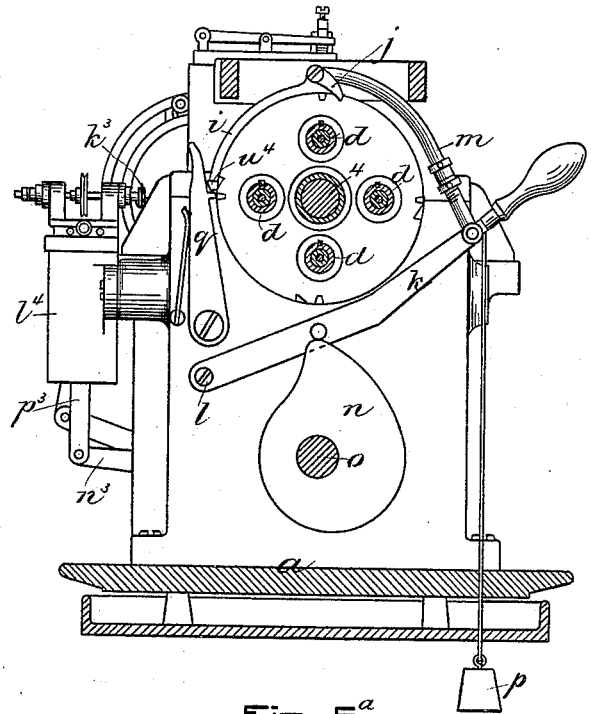
Fig. 5ª
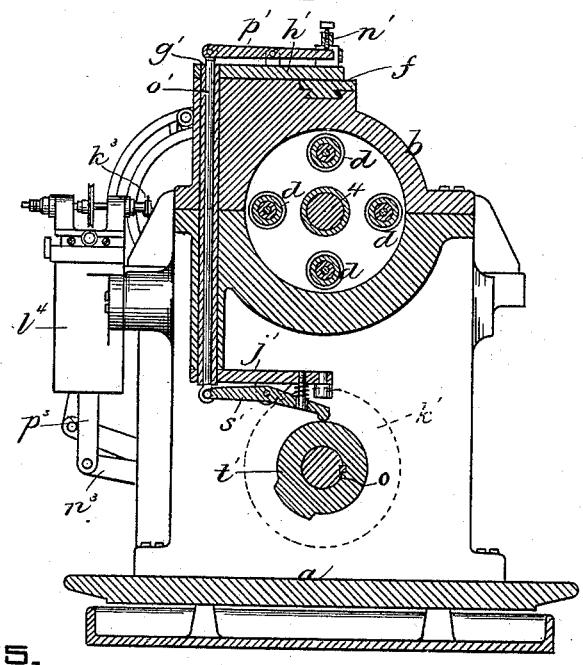
Fig. 5ᵇ
WITNESSES.
Thos. E. O'Connor
H. Brown
INVENTOR.
E. A. Marsh
by Wright & Brown
Attys (No Model.) 7 Sheets—Sheet 6.
E. A. MARSH.
SCREW MACHINE.
No. 329,182. Patented Oct. 27, 1885.
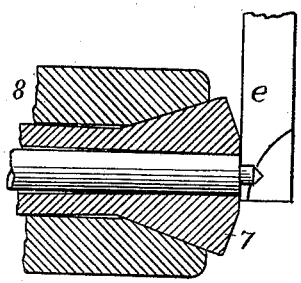
Fig. 6.
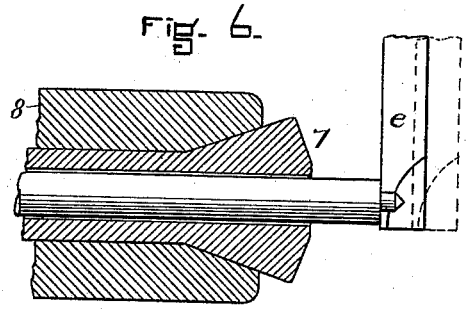
Fig. 7.
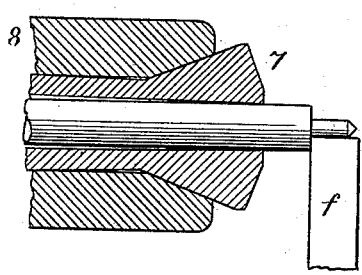
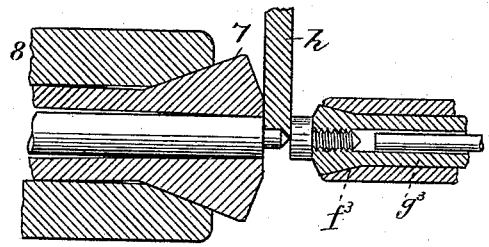
Fig. 8.  Fig. 10.
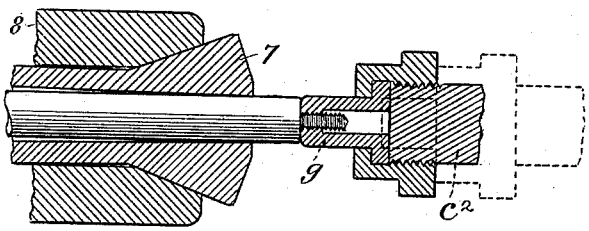
Fig. 9.
WITNESSES.
Thos. E. O'Connor
H. Brown.
INVENTOR.
E. A. Marsh
by Wright & Brown
Attys
N. PETERS, Photo-Lithographer, Washington, D.C.

(No Model.)  7 Sheets—Sheet 7.

E. A. MARSH.
SCREW MACHINE.

No. 329,182. Patented Oct. 27, 1885.

WITNESSES.
Thos. E. O'Connor
H. Brown.

INVENTOR.
E. A. Marsh
by Wright & Brown
Attys.

UNITED STATES PATENT OFFICE.

EDWARD A. MARSH, OF NEWTON, MASSACHUSETTS.

SCREW-MACHINE.

SPECIFICATION forming part of Letters Patent No. 329,182, dated October 27, 1885.

Application filed July 17, 1885. Serial No. 171,849. (No model.)

*To all whom it may concern:*

Be it known that I, EDWARD A. MARSH, of Newton, in the county of Middlesex and State of Massachusetts, have invented certain new and useful Improvements in Metal-Screw Machines, of which the following is a specification.

This invention relates to that class of screw-machines in which several blanks or metal rods are operated upon simultaneously in one machine, the rods being held by a series of spindles in a rotary head or drum, said spindles presenting the rods or blanks held by them simultaneously to the different tools used in making a screw, while the head is partially rotated from time to time to present each spindle successively to all the tools of the series.

My invention consists in the several improvements in machines of this class hereinafter described and claimed.

Figure 1:
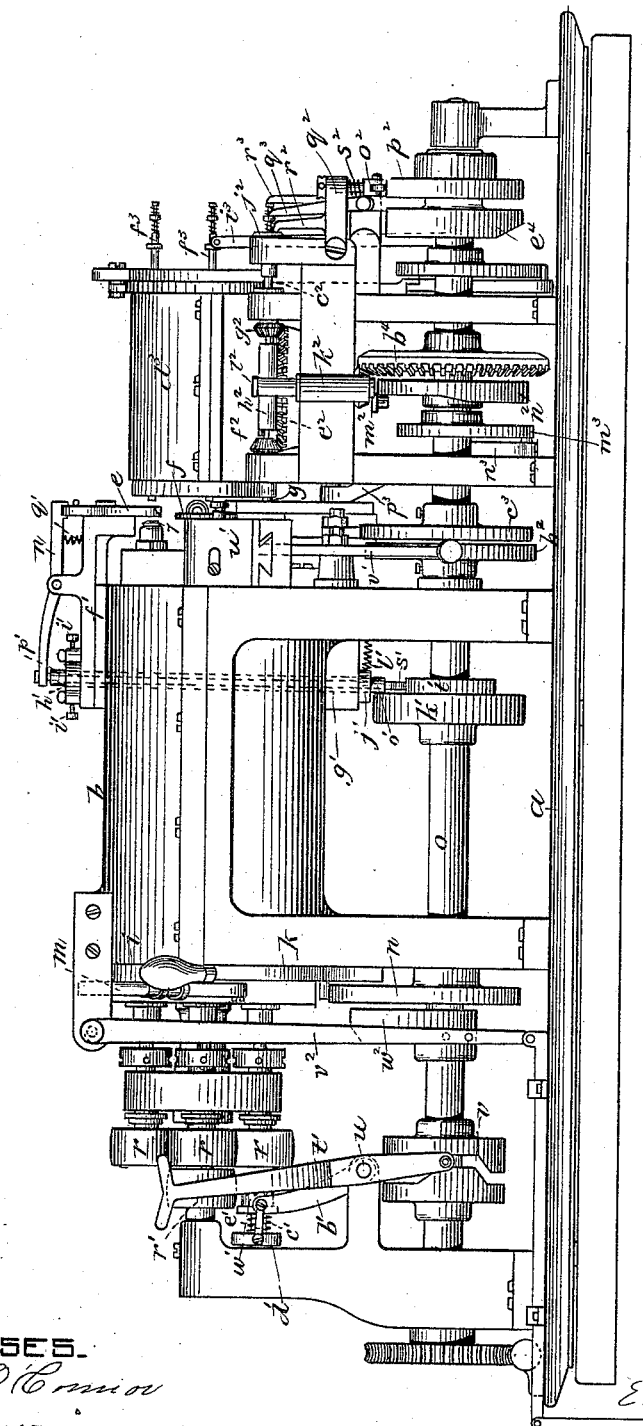
Figure 5:
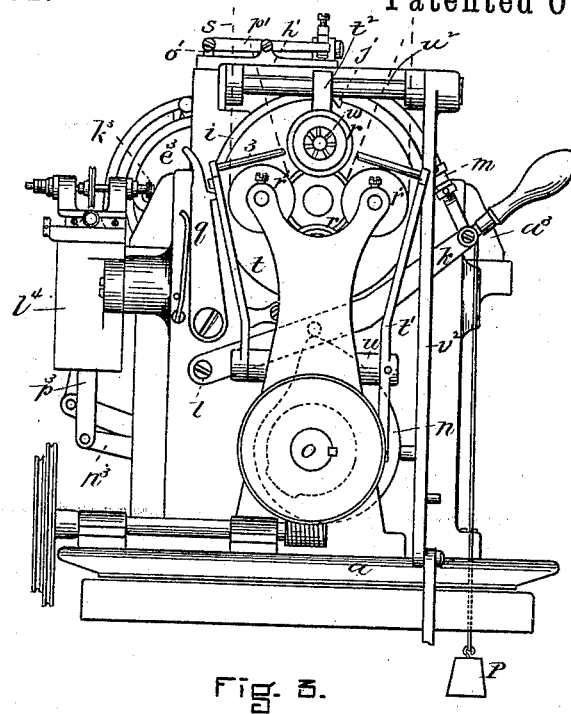
Figure 4:
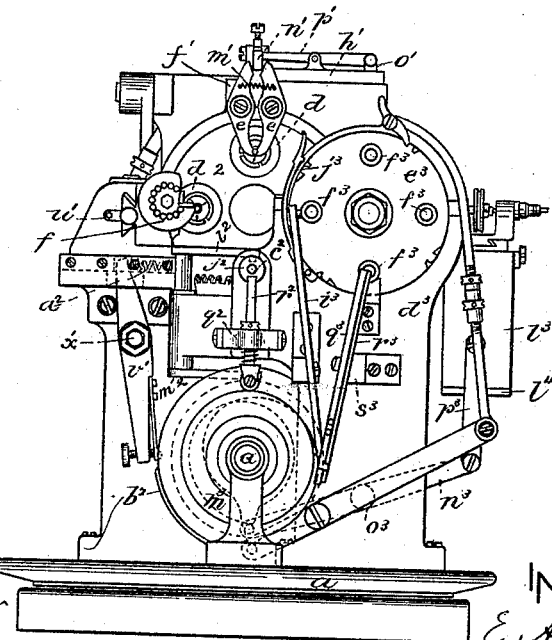
Figure 5:
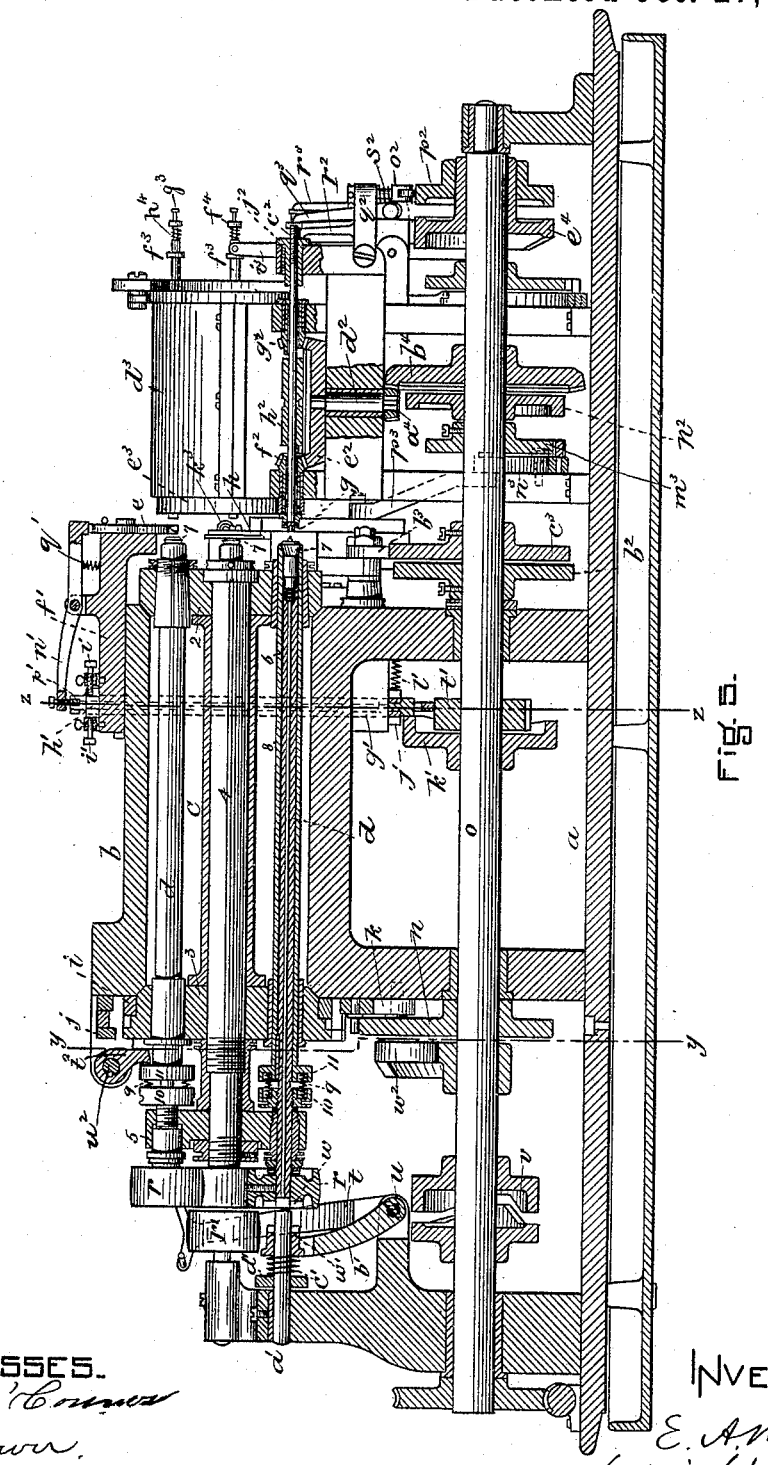
Figures 11, 12:
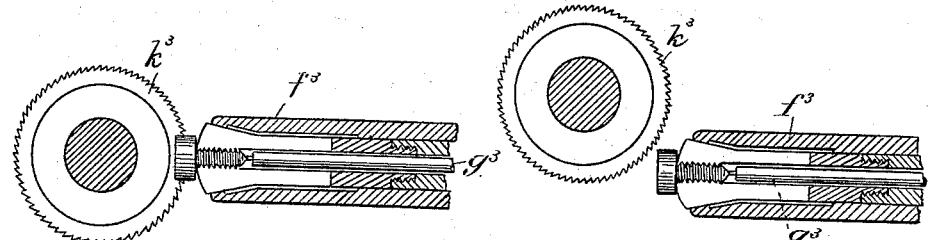
Figure 13:
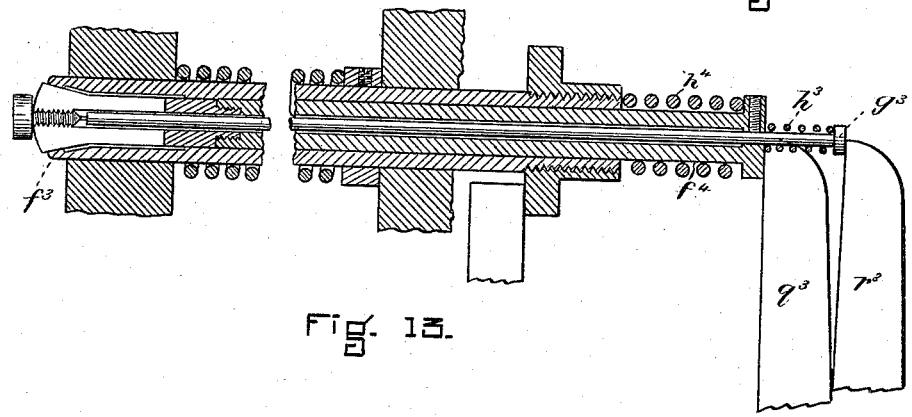
Figure 14:
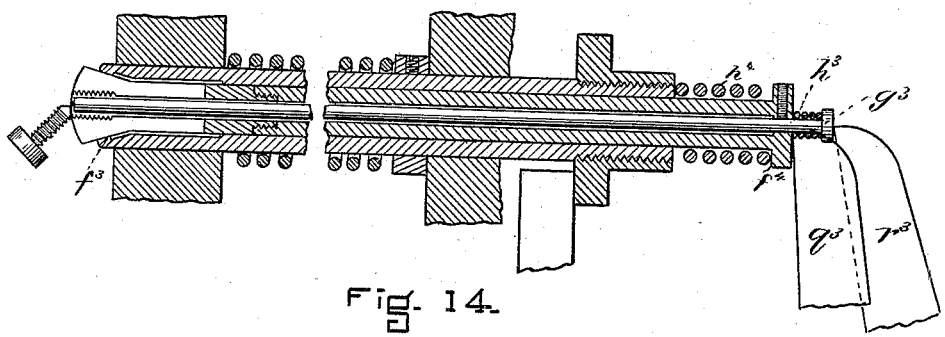

Of the accompanying drawings, Figure 1 represents a side elevation of my improved screw-machine. Fig. 2 represents a top view of the same. Fig. 2$^a$ represents an enlarged top view of a portion of the machine. Figs. 3 and 4 represent elevations from opposite ends of the machine. Fig. 5 represents a longitudinal vertical section on the plane of line $x$ $x$, Fig. 2. Fig. 5$^a$ represents a section on line $y$ $y$, Fig. 5. Fig. 5$^b$ represents a section on line $z$ $z$, Fig. 5. Figs. 6 to 14, inclusive, represent enlarged sectional views showing the different steps in the operation of making a screw.

The same letters of reference indicate the same parts in all the figures.

In the drawings $a$ represents the bed-plate, on which is mounted a casing or head-stock, $b$, having a large cylindrical opening, in which is fitted a rotary head or drum, $c$. Said head, for lightness, is made in the form of a spool, and is composed of two disks or ends, 2 3, connected by a longitudinal rod, 4, and bearing on the inner surface of the head-stock at the ends of the latter, and a third disk or plate, 5, secured to the rod 4. In the head $c$ are fitted to rotate four running spindles, $d$, placed at equal distances apart, and equidistant from the axis of the head or drum $c$. Each running spindle is composed of an interior spindle, 6, to which is attached the rod-holding chuck 7, having self-opening spring-jaws, and an outer spindle, 8, which is capable of endwise motion on the inner spindle, and when moved in one direction closes the jaws of the chuck upon the rod from which the screws are made, and when moved in the opposite direction allows said jaws to release the rod. This form of spindle is technically known as a "slide-spindle." The outer spindle is moved forward to close the jaws of the chuck by means of springs 9, interposed between flanges 10 11, formed on the two spindles, and is moved backwardly to release the jaws by means hereinafter described.

At the front end of the head $c$ are located four devices which co-operate simultaneously with the four spindles, viz: first, a pair of jaws, $e$ $e$, which grasp the projecting end of the wire in the highest spindle and draw it outwardly a distance equal to the length of a screw; secondly, a cutter, $f$, Figs. 1, 2, 4, 8, which reduces the projecting end of the wire and forms the unthreaded shank of the screw; thirdly, a screw-cutting die, $g$, Figs. 5 and 9, which advances and cuts the thread upon said shank; and, fourthly, a cutter, $h$, Figs. 2 and 10, which severs the wire, and thus forms the outer surface of the head of the screw, and leaves the end of the wire pointed and slightly reduced, and projecting sufficiently beyond the chuck that holds it to enable the jaws $e$ $e$ to grasp it, Fig. 6. The head $c$ is rotated intermittently a quarter of a rotation at a time to present each chuck successively to the feeding-jaws $e$, the reducing-cutter $f$, the screw-cutting die $g$, and the severing-cutter $h$. This rotation of the head $c$ is effected by means of a ring, $i$, journaled upon the periphery of the rear end plate, 3, of the head or drum, and having a spring-pawl, $j$, adapted to engage with notches cut in the periphery of said end plate, 3, (there being four of said notches cut at equal distances apart, as shown in Fig. 5$^a$,) and mechanism for oscillating said ring upon the plate 3 to rotate the head $c$ step by step, a quarter-rotation at each step. Said mechanism consists of a lever, $k$, pivoted at $l$, Figs. 3 and 5$^a$, to a fixed part of the supporting-frame, and connected by a rod, $m$, to the ring $i$, a cam, $n$, on the main driving-shaft $o$, the periphery of which supports a stud or roller on the lever $k$, and a weight, $p$, or its equivalent, (as a spring,) which is suspended from the lever $k$, and holds the stud thereof against the surface of the cam $n$. The lever $k$ is alternately raised by the cam and depressed by the weight. When it is being raised, it rotates the ring $i$ backwardly until a projection, $u^4$, thereon strikes and throws out a latch, $q$, Figs. 3 and $5^a$, engaged with one of the notches in the plate 3, the pawl $j$ at the same moment engaging with another notch. The lever $k$ is then depressed, and causes the pawl $j$ to give the head $c$ a partial rotation, the latch $q$ bearing against the periphery of the plate 3, and springing into the following notch and locking the head after it has made a quarter-rotation.

The spindles are not rotated while they are presented to the feeding-jaws $e$ $e$ and screw-cutting die $g$, but are rotated while presented to the cutters $f$ and $h$, as said cutters do not rotate. Each spindle has a pulley, $r$, affixed to its rear end, and the pulleys of the two spindles that are presented to the cutters $f$ $h$ are rotated simultaneously by means of a belt or belts. Before each rotation of the head $c$ said belts are shipped automatically onto two loose pulleys, $r'$ $r'$, journaled on studs affixed to the frame of the machine, and when the head is arrested the belts are shipped onto the pulleys of the two spindles to be rotated.

The shipping device consists of two shipper bars or levers, $t$ $t'$, engaged with the belt, a rock-shaft, $u$, to which said levers are rigidly attached, and a cam, $v$, on the driving-shaft engaged with a stud or roller on the lever $t'$.

It being essential that the chuck that is presented to the screw-cutting die $g$ be rigidly held so that the wire therein will not be rotated by the action of said die, I provide at the rear end of each spindle a clutch member, $w$, each of which co-operates successively with a corresponding clutch member, $w'$, Figs. 1, 2, and 5, which is located on a fixed stud, $a'$, in line with the spindle presented to the screw-cutting die. The clutch member $w'$ is moved back and forth on said stud by an arm, $b'$, attached to the rock-shaft $u$, said arm being connected at its upper end with the clutch member $w'$. Just before the head $c$ is rotated to advance the spindles to their next position the clutch member $w'$ is drawn backward; but as soon as the head is arrested said member is thrown forward and engages with the corresponding member, $w$, on the spindle presented to the screw-cutting die, thus preventing said spindle from rotating.

The clutch members may be of any suitable construction. In this instance I have shown each member as having a series of teeth or fingers, with V-shaped outer ends (see Fig. 2) adapted to enter spaces between the teeth of the other member. The V-shaped ends of the teeth insure the engagement of the clutch members in case the ends of the teeth of the two members abut against each other in meeting. The member $w'$ is given a yielding movement by means of a spring, $c'$, interposed between it and a collar, $d'$, connected to the lever $b'$ by links $e'$, Fig. 1. In case the ends of the teeth of the two members abut against each other to such an extent as to prevent the entrance of the teeth of each into the spaces of the other, the spring $c'$ permits the member $w'$ to accommodate itself to the situation. The bifurcated ends of the lever $b'$ have inwardly-projecting studs, which bear against a shoulder on the member $w'$ and effect the backward movement of said member, the forward movement being effected through the links $e'$, collar $d'$, and spring $c'$.

I will now proceed to describe in detail the feeding-jaws $e$ $e$, the shank-reducing cutter $f$, the screw-forming die $g$, and the severing-cutter $h$, with the mechanism operating said parts.

The feeding-jaws $e$ $e$ are pivoted to a slide, $f'$, that is fitted to move in guides on the head-stock $b$, and is reciprocated by the following mechanism, viz: first, a vertical rock-shaft, $g'$, (shown in Fig. $5^b$, and by dotted lines in Figs. 1 and 5,) journaled in the head-stock; secondly, an arm, $h'$, affixed to the upper end of said rock-shaft and projecting between two adjustable screws, $i'$ $i'$, in posts affixed to the slide $f'$; thirdly, an arm, $j'$, affixed to the lower end of said rock-shaft $g'$; fourthly, a cam, $k'$, on the driving-shaft $o$; and, lastly, a spring, $l'$, which presses the arm $j'$ against the cam $k'$. The rotation of the cam $k'$ causes the rock-shaft $g'$ to rock and oscillate the arm $h'$, which reciprocates the slide $f'$ a distance determined by the adjustment of the screws $i'$ $i'$. These devices cause the slide $f'$ to move forward from the end of the head $c$ with the feeding-jaws, then stop, then move farther forward, and finally return to their starting-point.

The wire-grasping ends of the jaws $e$ $e$, which are normally separated by a spring, $m'$, are caused to close upon the wire in the presented chuck while the slide $f'$ is making its first forward movement by means of, first, a lever, $n'$, pivoted to a stud on the slide $f'$, and projecting at one end between the inner sides of the jaws $e$ $e$ above their pivots; secondly, a rod, $o'$, passing through the center of the rock-shaft $g'$; thirdly, a lever, $p'$, pivoted at one end to the rod $o'$ and at its center to ears on the rock-shaft arm $h'$, its other end projecting under the rear end of the lever $n'$, and constituting a bearing, against which a screw or stud on the lever $n'$ is held by a spring, $q'$; fourthly, a lever, $s'$, pivoted at one end to the lower end of the rod $o'$ and at its center to the lower rock-shaft arm $j'$; and, lastly, a cam, $t'$, on the shaft $o$, on which one end of the lever $s'$ bears. These last-described devices depress the forward end of the lever $n'$ during the first forward movement of the slide $f'$, and raise it during the second forward movement and while the slide is moving backward, thus causing the jaws to grasp the end of the wire (see Fig. 6) and feed it forward a sufficient distance, Fig. 7, and then release the wire. After the jaws release the wire they continue to move forward, as shown in dotted lines, Fig. 7, until they clear the wire, and remain so until after the next partial rotation of the head $c$, when they return to place, and are ready to grasp the wire in the next spindle. While the feeding-jaws are moving the rod or wire forward, the jaws of the chuck are opened to release the wire by a toe, $t^2$, on a rock-shaft, $u^2$, journaled in bearings attached to the head-stock, and provided with an arm, $v^2$, which bears against a cam, $w^2$, on the shaft $o$. The toe $t^2$ bears against the flange 11 of the outside spindle, and is oscillated by the described means so as to press back said spindle and permit the jaws to open at the proper time.

The wire-reducing and shank-forming cutter $f$ is secured to a slide or carriage, $u'$, which is movable toward and from the center of the spindle presented to the cutter $f$, and in a direction at right angles to the axis of the spindle. Said carriage is moved by means of a lever, $v'$, pivoted upon a stud, $x'$, affixed to the frame of the machine, and forced by a spring, $a^2$, against a cam, $b^2$, on the driving-shaft $o$, said cam and spring causing the lever to oscillate and reciprocate the cutter $f$. Said cutter is formed to reduce the end of the rod, as shown in Fig. 8, thus forming the blank for the shank of the screw.

The screw-cutting die $g$ is secured to a spindle, $c^2$, which is journaled in bearings in the frames of the machine, and is rotated alternately in opposite directions by means of, first, a continuously-rotated vertical arbor, $d^2$, Fig. 5, having a bevel-pinion, $a^4$, at its lower end, meshing with a bevel-gear, $b^4$, on the shaft $o$, and a bevel-gear, $e^2$, at its upper end; secondly, two bevel-pinions, $f^2$ $g^2$, meshing with said gear $e^2$ at opposite sides of its center; and, thirdly, a sliding sleeve, $h^2$, on the spindle $c^2$, which sleeve is provided at its ends with clutch teeth or members $i^2$, engaging with corresponding teeth on the pinions $f^2$ $g^2$. The sleeve $h^2$ is reciprocated lengthwise on the spindle $c^2$, to cause it to engage alternately with the pinion $f^2$ and the pinions $g^2$. The sleeve is engaged by a groove and feather with the spindle $c^2$, so that the latter is rotated by the sleeve. It will be seen, therefore, that when the sleeve is engaged with one pinion it is rotated with the spindle and its die in one direction, and when engaged with the other pinion its rotation and that of the spindle and die is reversed. The spindle $c^2$ has a portion of its periphery screw-threaded at its rear end (see Fig. 5) of the same pitch as the thread in the die $g$, said threaded portion engaging with an internal thread formed in a nut or bearing, $j^2$, the spindle being thus caused to move endwise first in one direction and then in the opposite direction, each change in the direction of its rotation causing a reversal of its longitudinal movement. The die $g$ is therefore moved alternately toward and from the rigidly-held chuck, and as the die is in axial alignment with said chuck it cuts a thread on the reduced end of the rod held thereby when moving toward the chuck, and then withdraws.

The sleeve $h^2$ is reciprocated by a rock-shaft, $k^2$, which is provided at its upper end with an arm, $l^2$, engaged with the sleeve $h^2$ by means of a band encircling the sleeve and pivoted to the arm $l^2$.

The lower end of the rock-shaft $k^2$ is provided with an arm, $m^2$, which bears against a cam, $n^2$, on the shaft $o$.

The internally-threaded nut or bearing $j^2$ is capable of moving lengthwise without rotating in its support, so that in case a screw is broken and a part thereof remains in the die, the die, spindle, and sleeve will yield when the die is next advanced, and thus prevent undue strain or breakage of any of the parts. Said sleeve is, however, prevented from yielding when no such emergency arises by a caster, $o^2$, running on a cam, $p^2$, on the shaft $o$, a lever, $q^2$, pivoted to the fixed frame, and having an arm, $r^2$, bearing against the rear end of the sleeve $j^2$, the shank of said caster passing through the outer end of said lever and being adapted to slide vertically therein, and a spring, $s^2$, interposed between a shoulder on the shank of the caster and the under side of the lever. The spring supports the lever $q^2$ and holds its arm $r^2$ against the sleeve $j^2$ with sufficient force to prevent the sleeve from yielding, excepting when its forward movement is resisted by the above-described cause.

The cam $p^2$ is so formed as to oscillate the lever $q^2$ and cause its arm $r^2$ to press more firmly against the nut $j^2$ when the spindle $c^2$ is moving forward than when it is moving backward.

The severing-cutter $h$ is mounted on a slide or carriage, $a^3$, which is reciprocated on a fixed guide by a lever, $b^3$, a cam, $c^3$, on the shaft $o$, and a spring (not shown) which presses the lever $b^3$ against the cam $c^3$. The cutter $h$ is arranged to move toward the chuck and sever the rod at a distance from the threaded shank equal to the thickness of the head of the screw, and at the same time may partially reduce and point the end of the rod as shown in Fig. 10, the reduced portion being grasped by the jaws $e$ $e$ when the rod is next presented to them.

$d^3$ represents a tail-stock, in which is journaled a head, $e^3$, having three or more spindles, $f^3$, facing in the opposite direction from the spindles $d$. The tail-stock spindles $f^3$ are capable of moving longitudinally, but are not rotated, and their chucks are closed by means of a draw-in spindle, $f^4$, and spring $h^4$, and are internally threaded to receive the threaded shanks of the screws. Each tail-stock spindle has a longitudinal push-rod, $g^3$, which is normally withdrawn from the chuck by a spring, $h^3$, and is forced into the chuck at the proper time, by means hereinafter described, to eject the completed screw therefrom. The axis of the head-stock is located out of line with that of the tail-stock, so that the spindle $f^3$, at the extreme inner side of the tail-stock head, is in line with the head-stock spindle presented to the severing-cutter $h$, while the other tail-stock spindles are entirely at one side of the head-stock. Just before the severing-cutter completes its work in severing a screw the tail-stock spindle in line with the head-stock spindle, holding the rod from which the screw is being severed, is moved forward by means of an oscillating lever, $i^3$, engaged with a collar on the outer spindle or tube, $f^3$, of the tail-stock spindle, and as the rod is being rotated the threaded screw-shank thereon is turned into the correspondingly-threaded chuck of the tail-stock spindle until the head of the screw comes to a bearing on said chuck, whereupon, the rod being nearly severed, the small neck which connects the screw to the rod is broken, and the screw is detached from the rod and securely held by the tail-stock spindle, which is immediately withdrawn by the lever $i^3$.

The head $e^3$ is rotated, step by step, one-quarter of a complete rotation at each step by means similar to those used to rotate the head $c$, and is locked by a latch, $j^3$, Fig. 4, after each step, said latch being thrown out before each rotation in the same manner that the latch holding the head $c$ is thrown out. The described step-by-step rotation of the head $e^3$ brings the heads of the screws held by the chucks thereof to the slotting-saw $k^3$, the arbor of which is journaled in a vertically-reciprocating carriage, $l^3$, which is raised to cause the rotating saw $k^3$ to cross the head of the screw held by one of the chucks $f^3$, while the head $e^3$ is locked after each partial rotation.

The carriage $l^3$ is reciprocated on a fixed guide, $l^4$, by means of a cam, $m^3$, on the driving-shaft $o$, a lever, $n^3$, pivoted at $o^3$ to the tail-stock and bearing against said cam, and a link, $p^3$, connecting the lever $n^3$ to the carriage $l^3$.

After each screw-head has been slotted, the next partial rotation of the head $e^3$ brings the completed screw into line with two levers, $q^3$ $r^3$, pivoted side by side upon a bracket, $s^3$. Said levers are oscillated by a cam, $e^4$, on the driving-shaft in such manner that the upper end of the lever $q^3$ first pushes forward the inner tube, $f^4$, of the spindle holding the completed screw enough to cause the spring-jaws of the chuck thereof to open; then the upper end of the lever $r^3$ pushes forward the ejector $g^3$, which forces the screw out of the chuck, Fig. 14.

I do not here claim, broadly, a head having a series of spindles and capable of being rotated step by step to different working positions, and of being locked in each position, combined with a series of devices co-operating with said spindles to feed and cut the wire rods presented by the spindles; nor do I here claim the combination of two heads, each having a series of spindles, the spindles of the first head presenting the wire rods to a series of rod feeding and cutting devices, while the spindles of the second head take the partially finished articles from the spindles of the first head and present them to a finishing-cutter, as both of these combinations are claimed in my application for Letters Patent for a machine for turning or roughing out arbors, pinions, &c., filed with the present application.

I claim—

1. In a screw-machine, the combination of a head or drum fitted to rotate in a head-stock or bearing, and provided with a series of running spindles, a series of devices arranged to act simultaneously on wire rods held by the series of chucks when the latter are in operative position, said devices being, first, a pair of feeding-jaws; secondly, a reducing or screw-shank-forming cutter; thirdly, a screw-cutting die; and, fourthly, a rod-severing cutter; mechanism for operating said devices, substantially as described, and mechanism for rotating said head step by step, and thereby presenting each spindle to each of the co-operating devices in succession, means whereby the spindles presented to the cutters are rotated, and means whereby each spindle when presented to the screw-cutting die is prevented from rotating, as set forth.

2. In a screw-machine, the combination of a rotary head or drum, provided with a series of running spindles, mechanism for rotating said head step by step, a pair of feeding-jaws, and mechanism, substantially as described, whereby said jaws are caused, first, to grasp the end of a rod held in the spindle presented to it; secondly, to move forward with the rod; thirdly, to release the rod and then move forward sufficiently to clear the rod until after the next partial rotation of the head; and, finally, to move back into position to grasp the rod of the next spindle, as set forth.

3. The combination of the rotary head, the series of spindles journaled therein, each having a clutch member at its rear end, a screw-cutting die arranged to act upon a blank held by one of said spindles, a sliding non-rotating clutch member supported by the frame of the machine, and mechanism, substantially as described, whereby said sliding member is engaged with the clutch member of each spindle when the latter is presented to the screw-cutting die and withdrawn after said die has operated, as set forth.

4. The combination of the rotary head, the series of spindles journaled therein, each having a pulley at its rear end, mechanism for rotating said head step by step, the cutters $f$ $h$, arranged to act simultaneously on the rods held by two of said spindles, operating mechanism for said cutters, two idle-pulleys arranged to coincide with the pulleys of the two spindles presented to the cutters $f$ $h$, a driving belt or belts, belt-shippers, and mechanism to operate them, whereby the belts are kept upon the idle-pulleys while the head is rotating and upon the coinciding spindle-pulleys when the head is in operative position after each partial rotation, as set forth.

5. The combination of the journaled head, the series of spindles journaled therein, each having a pulley and a clutch member at its rear end, mechanism for operating said head step by step, the cutters $f\ h$, and screw-cutting die $g$, arranged to co-operate simultaneously with three of said spindles, mechanism for operating said cutters and die, the sliding clutch member arranged to co-operate with the clutch member of the spindle presented to the screw-cutting die, the loose pulleys arranged to coincide with the pulleys of the two spindles presented to the cutters $f\ h$, the driving belt or belts, the belt-shippers, and mechanism, substantially as described, for reciprocating said belt-shippers and sliding clutch member, whereby the two spindles presented to the cutters are rotated, and the spindle presented to the screw-cutting die is locked after each partial rotation of the head, as set forth.

6. The combination of the rotary head, the spindles journaled therein, mechanism, substantially as described, for rotating said head and operating the spindles, the feeding jaws, reducing-cutters, and screw-cutting die and their operating mechanism, the rotary tail-stock head or drum having a series of non-rotating longitudinally-movable spindles, $f^3$, with screw-threaded chucks, mechanism for rotating the tail-stock head step by step to bring its spindles successively into line with one of the head-stock spindles, means for moving each tail-stock spindle forward when brought to the position last indicated to engage it with a screw-shank, and then backward to remove the screw from the head-stock, a slotting saw or cutter, to which the screw-heads held by the tail-stock spindles are presented by each partial rotation of the tail-stock head, means for operating said cutter, and means for ejecting the screws from the tail-stock spindles after they have been slotted, as set forth.

7. The combination, with the spindles $d$, having the clutch-members $w$ at their rear ends, the sliding non-rotating clutch member $w'$, the spring $c'$, backing said sliding member, and mechanism, substantially as described, for applying pressure through said spring to move the sliding member forward, the spring permitting the sliding member to yield in moving forward, as and for the purpose specified.

8. The combination of the threaded spindle $c^2$, having the screw-cutting die, the nut $j^2$, engaged with the threaded portion of said spindle, the pinions $f^2\ g^2$, rotated continuously in opposite directions on said spindle, the sleeve $h^2$, rotating with and movable lengthwise on said spindle, and formed at its ends to engage with the pinions $f^2\ g^2$, and mechanism whereby said collar is reciprocated lengthwise to engage it alternately with the pinion $f^2$ and the pinion $g^2$, as set forth.

9. The combination of the spindle $c^2$, the movable nut $j^2$, the mechanism for rotating the spindle and for reversing its rotation, and devices, substantially as described, for supporting the nut $j^2$ with a yielding pressure, as set forth.

In testimony whereof I have signed my name to this specification, in presence of two subscribing witnesses, this 11th day of July, 1885.

EDWARD A. MARSH.

Witnesses:
C. F. BROWN,
H. BROWN.